United States Patent [19]

Levine

[11] Patent Number: 4,719,254

[45] Date of Patent: Jan. 12, 1988

[54] EPOXY ESTER-MODIFIED ALKYD RESIN ENAMEL FORMULATIONS

[75] Inventor: Stanley W. Levine, Phoenix, Ariz.

[73] Assignee: International Coating & Chemical Company, Inc., Fairfield, Conn.

[21] Appl. No.: 867,240

[22] Filed: May 23, 1986

[51] Int. Cl.⁴ .................... C08L 67/08; C08L 63/10
[52] U.S. Cl. .................... 523/435; 523/456; 523/463; 525/438; 525/444.5; 525/463; 106/252; 106/253; 106/263
[58] Field of Search .......... 523/435, 463, 456; 525/438, 444.5; 106/252, 253, 263

[56] References Cited

U.S. PATENT DOCUMENTS

| | | | |
|---|---|---|---|
| 2,768,150 | 10/1956 | Millar | 525/438 |
| 2,843,560 | 7/1958 | Mika | 523/435 |
| 2,864,722 | 12/1958 | Millar | 525/438 |
| 3,015,637 | 1/1962 | Rauner | 525/444.5 |
| 3,493,414 | 2/1970 | Hastings | 525/438 |

FOREIGN PATENT DOCUMENTS 738660 10/1955 United Kingdom ............ 525/444.5

*Primary Examiner*—C. Warren Ivy
*Attorney, Agent, or Firm*—Kramer, Brufsky & Cifelli

[57] ABSTRACT

Epoxy ester-modified alkyd resin formulations are provided comprising:

(i) from about 70 to 80 wt % soya modified alkyd resin;
(ii) from about 4.75 to 10 wt % epoxy ester resin;
(iii) from about 4.75 to 10 wt % silicone modified alkyd resin; and
(iv) from about 0.5 to 10 wt % compatible solvent.

These alkyd resin formulations can be pigmented to provide a wide variety of pigmented, epoxy ester modified, air dry alkyd enamels.

20 Claims, No Drawings

EPOXY ESTER-MODIFIED ALKYD RESIN ENAMEL FORMULATIONS

This invention relates to alkyd resin enamel formulations. More particularly, this invention relates to epoxy ester-modified alkyd resin air drying enamel formulations.

Alkyd-type resins are widely used in such varied applications as enamels, lacquers, textile finishes, metal primers, caulking compounds, slushing mixtures, protective coatings and films, leather coatings and water emulsion paints. These products may be applied by a wide variety of techniques including brushing, spraying, dipping, hot-melt, knife spreading, roller coating, and the like.

Because of the versatility of such alkyd-type resins and their reasonable cost, much effort has been devoted in recent years toward improving the properties and applications of these resins to further extend their usage. Of particular importance has been the effort to obtain enamels which impart high gloss, good weathering characteristics, and long life coupled with good adhesion to surfaces at reasonable cost.

These as well as other objects and advantages are accomplished by the present invention which provides epoxy ester-modified alkyd resin formulations, comprising:

(i) from about 70 to 90 wt % soya modified alkyd resin;
(ii) from about 4.75 to 10 wt % epoxy ester resin;
(iii) from about 4.75 to 10 wt % silicone modified alkyd resin; and
(iv) from about 0.5 to 10 wt % compatible solvent.

In addition, the enamel formulations of the present invention can also contain from about 0 to 5 wt % of conventional additives such as anti-skinning agents, driers, drying activators, silicone additives, and the like.

The epoxy-ester modified alkyd resin formulations of the present invention can be admixed with pigment dispersions to form a wide range of pigmented enamels which have been found extremely suitable for interior household purposes as well as providing an excellent exterior surface coating exhibiting fine adhesion and resistance to weathering.

The alkyd resins employed in the present invention are the resinous reaction products of di- and polyhydric alcohols and poly-basic acids or fatty monobasic acids or anhydrides. Illustrative of suitable di- and polyhydric alcohols are glycerol, pentaerythritol, sorbitol, mannitol, ethylene, diethylene, or propylene glycols, trimethylol ethane, trimethylol propane, and the like. Illustrative of suitable acids and anhydrides are phthalic anhydride, isophthalic acid, fumaric acid, succinic acid, adipic acid, azelaic acid, sebacic acid, maleic anhydride, the rosin adduct of maleic anhydride, and the like. The methods for alkyd resin production from the alcohol and acid or anhydride reactants are well known in the art.

The alkyd resins of the present invention are modified with semi-drying oils or mixtures of semi-drying oils with drying or non-drying oils. The preferred modifying oil as soya bean oil either used per se or in admixture with linseed, dehydrated castor, tall, tung, fish, perilla, oiticica, sunflower, and/or safflower oils. While soya bean oil is somewhat slower drying than those prepared from linseed, tung, dehydrated castor oils, and the like; nevertheless, soya bean oil is preferred as the modifying oil since it yields oil modified alkyd resins which are light colored and low in cost.

The soya bean oil modified alkyd resins of the present invention are considered medium oil length alkyd resins containing about 45-55% oil. Preferably, the alkyd resin is prepared from phthalic anhydride and glycerol wherein the resin contains a minimum of about 30 wt % phthalic anhydride. The modifying oil is preferably a mixture of soya bean and linseed oils. One such soya modified alkyd resin is a soya-linseed medium alkyd available from Cargill, Inc., Minneapolis, Minn., as Cargill Medium Alkyd 5114, a resin solution in mineral spirits (50% by weight solids at least 30% phthalic anhydride; viscosity range=U-Z; acid number on solids=12 max.; acid number on solution=6 max.; and color=10 max). The soya bean oil modified alkyd resins are admixed in the epoxy ester-modified alkyd resin formulations of the present invention in amounts ranging from about 70 to 90 wt %, preferably from about 82 to 88 wt %, and most preferably, about 85 wt %.

The epoxy ester resins employed in the present invention are produced by reaction of epoxy compounds such as epichlorohydrin with dihydric phenols such as catechol, resorcinol, hydroquinone, pyrogallol, phloroglucinol, and most preferably, Bisphenol A to yield glycidyl polyether resins. These polyethers are esterified by reaction with fatty or rosin acids to yield the epoxy resin esters of the present invention. One such epoxy resin ester is available from Cargill, Inc., Minneapolis, Minn., as Cargill Epoxy Ester 7872, an epoxy resin esterified with tall oil fatty acid, available as a resin solution in mineral spirits (60% by weight solids viscosity range=$Z_1$-$Z_3$; color=8 max.; acid value=6 max. (soln); and type of acid=TOFA). The epoxy ester resins are admixed in the epoxy ester-modified alkyd resin formulations of the present invention in amounts ranging from about 4.75 to 10 wt %, preferably about 4.75 to 7 wt %, and most preferably, about 5% by weight. The fatty acid esterification improves flexibility and solubility of the resin, converts the reactive hydroxyl and epoxide groups to ester groups which are somewhat less reactive and, if the fatty acid is unsaturated, provides some drying or curing action by means of the unsaturated linkages.

The silicone modified alkyd resins employed in the present invention are produced by modification of the soya alkyd resins described hereinabove with at least about 30 wt % silicone. The phthalic anhydride content of the alkyd resin is a minimum of 15 wt %. Silicone modification provides a faster drying resin with better application properties exhibiting better heat resistance, weathering resistance and resistance to alkalis resulting in maximum exterior durability. One such silicone-modified alkyd resin is available from Cargill, Inc., Minneapolis, Minn. as Cargill Silicone-Alkyd 6260, a resin solution in mineral spirits (60% by weight solids phthalic anhydride content=15% min.; viscosity range=V-Z; acid number on solids=12 max.; acid number on solution=7.2 max.; color=13 max.; and modifier=30% silicone). The silicone-modified alkyd resins are admixed in the epoxy ester-modified alkyd resin formulations of the present invention in amounts ranging from about 4.75 to 10 wt %, preferably, about 4.75 to 7 wt %, and most preferably, about 5 wt %.

Any compatible solvent can be employed in the epoxy ester-modified alkyd resin formulations of the present invention. Although mineral spirits is most preferred because of being the solvent vehicle in which most of the components of the formulations are commercially available, any compatible aromatic or aliphatic hydrocarbon can be suitably employed such as benzene, toluene, naphthalene, hexane, heptane, or the like. The solvent is present in the resin formulation in amounts ranging from about 0.5 to 10 wt %, preferably, 0.5 to 2 wt %, and most preferably, about 1 wt %.

Additionally, if desired, one or more conventional additives can be admixed with the resin formulation in amounts ranging from about 0 to 6 wt %. Thus, for example, anti-skinning agents, preferably of the volative oxime type to prevent skinning of the ultimate enamel can be employed in amounts ranging from 0 to about 0.5 wt %, and most preferably, about 0.2 wt %; metallic driers, preferably, metallic salts of tall oil fatty acids wherein the salt forming metals are preferably cobalt, manganese, calcium or zirconium. These driers are strong oxidizers which effect rapid top drying of the enamel film. These driers can be employed in amounts ranging from 0 to about 3 wt %, most preferably from about 2 to 2.5 wt %; silicone additive to impart weather resistance and flexibility can also be employed in amounts ranging from 0 to about 2 wt %, and most preferably, about 1 wt %; drying activators such as 1,10-phenanthroline in a compatible solvent system which forms a complex with the metallic driers which is a more effective oxidation catalyst than the simple un-complexed metal ions. The drying activators can be employed in amounts ranging from 0 to about 0.5 wt %, and most preferably, about 0.3 wt %.

The epoxy ester modified alkyd resin formulations of the present invention can be conveniently prepared by thoroughly admixing the soya alkyd resin and the epoxy ester resin for about 5 to 15 minutes and then admixing therewith the silicone-modified alkyd resin, solvent and any desired additives with continuous mixing until a clear, homogenous epoxy ester-modified alkyd resin solution is developed. This resin solution functions as the clear base from which a whole series of pigmented, air dry alkyd enamels can be prepared.

A wide variety of pigment dispersions for use in conjunction with the clear resinous base of the present invention can be prepared by intimately dispersing the pigment or mixture of pigments desired in a soya-modified alkyd resin. Thus, from about 20 to 75 wt % of pigment can be dispersed in from about 20 to 80 wt % soya alkyd resin. Preferably, from 0 to about 5 wt % of a dispersing aid is included in the dispersion. The dispersion aid assists in wetting, suspending and dispersing the pigment within the resin. Other additives can also be suitably employed, if desired. Thus, grinding aids, thixotropic agents, anti-sag additives, and the like can be incorporated in the pigment dispersions. Generally, the alkyd resin, pigment and additives are admixed and ground on a 3-roll mill or steel ball mill until suitable dispersion is achieved. If desired, upon conclusion of grinding, the dispersion can be let down by addition of a solvent or diluent such as methanol, mineral spirits or additional alkyd resin.

The final pigmented enamel product can be prepared by admixing from about 70 to 78 wt % of the clear epoxy ester-modified alkyd resin base with from about 20 to 30 wt % of a pigment dispersion and from about 0 to 2 wt % of an anti-sag additive, to control the flow characteristics and reduce pigment settling. Troykyd Anti-Sag 4 (color(Gardner)=10–12; viscosity range=R-U; and specific gravity=1.02–1.08), available from Troy Chemical Corporation, Newark, N.J., is typical of the anti-sag additives which can be suitably employed in the present invention. Anti-sag additives are generally polar liquids that effect changes in paint rheology through the formation of micellular structures. The resulting decrease in mobility is observed as a decrease in sagging and settling. The resulting pigmented enamel has about 40–60% solids.

The following examples further illustrate various specific embodiments of the present invention. These examples are included for illustrative purposes only and are not to be construed as imposing any limitations upon either the scope or spirit of the present invention.

EXAMPLE 1

Preparation of Clear Epoxy Ester—Modified Alkyd Resin Base 656.50 pounds of soya-linseed medium alkyd resin (Cargill Medium Alkyd 5114) was thoroughly admixed for 10 minutes with 34.75 pounds of Cargill Epoxy Ester 7872. Thereafter, the following were added to the above admixture with continuous mixing:

| Lbs. | Material |
|---|---|
| 39.50 | Cargill Silicone Alkyd Resin 6260 |
| 1.25 | Exskin #2 anti-skinning agent available from Nuodex, Inc., Piscataway, New Jersey |
| 12.65 | 6% Zirconium drier, Nuodex, Inc. |
| 3.50 | 6% Cobalt drier, Nuodex, Inc. |
| 0.38 | 6% Manganese drier, Nuodex, Inc. |
| 1.08 | 40% Calcium drier, Nuodex,. Inc. |
| 7.46 | Silicone additive, No. DC-11 (functionality = carbanol), Dow Corning, Midland, MI |
| 2.00 | Active No. 8 drying activator (active ingredient = 1,10-phenanthroline (38%); 52% of normal butyl alcohol and 10% of 2-ethylhexoic acid), R. T. Vanderbilt Co., Norwalk, CT |

Mixing is continued until a homogeneous, clear solution is obtained. This solution or clear base exhibits a Gloss of 90+ and a viscosity of 95 KU. The yield is 100 gallons.

EXAMPLE 2

Preparation of Carbon Black Pigment Dispersion

Into a steel ball mill are added 272 pounds of Sterling XR carbon black pigment available from Cabot Corporation, Boston, Mass., 605 pounds of Cargill Soya Alkyd Resin 5114 and 27 pounds of Disperse-Ayd #1 (solids=75.75%; color (Gardner)=12 max.; and viscosity (G–H)=Q to T), dispersing agent available from Daniels Products, Inc., Jersey City, N.J. The materials are ground to prepare a fine dispersion of the carbon black pigment in the alkyd resin. The yield is 100 gallons.

EXAMPLE 3

Preparation of Red Oxide Pigment Dispersion 543.31 pounds of Cargill Soya Alkyd Resin 5114, 984.25 pounds of red oxide pigment No. RO-4097 available from Pfizer Chemical Corporation. New York, N.Y., and 26.25 pounds of Troykyd 98-C (solids=95% min.; specific gravity (80° F.)=0.903–0.918; color (Gardner)=14 max.; and viscosity (Gardner)=Z-3 max.), an amphoteric wetting and pigment dispersing agent available from Troy Chemical Corp., Newark, N.J., are pre-mixed to form a first pre-mix. A second pre-mix is prepared by admixing 13.15 pounds of Bentone 38, a thixotropic agent available from NL Industries, Hightstown, N.J., with 6.56 pounds of methanol. The first and second pre-mixes are admixed and ground in a 3-roll mill to prepare a fine dispersion of red oxide pigment in the alkyd resin. The yield is 100 gallons.

EXAMPLE 4

Preparation of Titanium Dioxide Pigment Dispersion 478.09 pounds of Cargill Soya Alkyd Resin 5114 is pre-mixed with 12.26 pounds of Disperse-Ayd #1, 4.90 pounds of MPA-60 grinding aid (an organic, high solids paste; density=0.82–0.87) available from NL industries, and 1227.05 pounds Ti Pure R-900 titanium dioxide pigment available from E. I. duPont Company de Nemours, Wilmington, Del. The pre-mix is ground in a High Speed Cowles-type mixer until the mixture reaches 110° F. to obtain a fine dispersion of titanium dioxide in the alkyd resin. The yield is 100 gallons.

EXAMPLE 5

Preparation of Yellow Oxide Pigment Dispersion

A pre-mix is prepared by admixing 841.00 pounds yellow oxide pigment No. 308 available from Pfizer Chemical Corporation, New York, N.Y. and 20.00 pounds Troykyd 98-C pigment dispersing agent. 450 pounds of Cargill Soya Alkyd Resin are pre-wet with 10 pounds Bentone 38 thixotropic agent and 5 pounds methanol. The pre-wet alkyd resin is added to the pre-mix and ground on a 3 roll mill to at least 6+. 114 pounds of Cargill Soya Alkyd Resin is added to the resulting admixture as a letdown to obtain 100 gallons of a fine yellow oxide pigment dispersion.

EXAMPLE 6

Preparation of Battleship Grey Enamel

A high gloss, battleship grey air dry enamel is prepared by admixing 664.80 pounds of the clear base prepared in Example 1 with the following dispersions:

| Pounds | Dispersion |
| --- | --- |
| 131.91 | Titanium Dioxide (Example 4) |
| 31.73 | Carbon Black (Example 2) |
| 2.20 | Red Oxide (Example 3) |
| 3.46 | Yellow Oxide (Example 5) |

The resulting admixture was thoroughly mixed and 17.10 pounds of Troykyd Anti-Sag No. 4, an anti-sagging agent available from Troy Chemical Corporation, Newark, N.J., is added thereto with continuous mixing to produce 100 gallons of a smooth uniformly pigmented battleship grey, air dry epoxy ester-modified alkyd enamel.

EXAMPLE 7

Preparation of Barn Red Enamel

A high gloss, barn red, air dry enamel is prepared by admixing 665.49 pounds of the clear base prepared in Example 1 with 38.23 pounds of the titanium dioxide pigment dispersion prepared in Example 4 and 145.43 pounds of the red oxide pigment dispersion prepared in Example 3. The mixture is admixed thoroughly and then 17.10 pounds of Troykyd Anti-Sag No. 4 is added thereto with continuous mixing to produce 100 gallons of a smooth uniformly pigmented barn red, air dry epoxy ester-modified alkyd enamel.

EXAMPLE 8

Preparation of Yellow Enamel

A yellow air dry enamel is prepared by admixing 617.89 pounds of clear base prepared in Example 1, 200.25 pounds of the yellow oxide pigment dispersion prepared in Example 5, and 17.10 pounds of Troykyd Anti-Sag No. b 4 with continuous mixing to produce 100 gallons of a smooth uniformly pigmented, yellow, air dry epoxy ester-modified alkyd enamel.

What is claimed is:

1. Epoxy ester-modified alkyd resin formulations comprising:
    (i) from about 70 to 90 wt % medium oil length soya modified alkyd resin;
    (ii) from about 4.75 to 10 wt % epoxy ester resin, comprising an epoxy resin esterified with fatty or rosin acids;
    (iii) from about 4.75 to 10 wt % silicone modified alkyd resin produced by modification of a said soya modified alkyd resin (i) with at least about 30 wt. % of silicone; and
    (iv) from about 0.5 to 10 wt % compatible solvent.

2. Alkyd resin formulations as defined in claim 1 wherein the soya-modified alkyd resin is a soya oil-linseed oil-modified alkyd resin.

3. Alkyd resin formulations as defined in claim 1 wherein the compatible solvent is mineral spirits.

4. Alkyd resin formulations as defined in claim 1 additionally containing from 0 to 6 wt % of one or more additives selected from the group consisting of anti-skinning agents, driers, drying activators and silicone said silicone additive to impart weather resistance and flexibility.

5. Alkyd resin formulations as defined in claim 1 wherein the soya-modified alkyd resin contains about 45–55 wt % of a soya-linseed oil mixture modifying an alkyd resin prepared from phthalic anhydride and glycerol wherein the resin contains at least about 30 wt % phthalic anhydride.

6. Alkyd resin formulations as defined in claim 1 wherein the soya-modified alkyd resin is present in amounts of from about 82 to 88 wt %.

7. Anlkyd resin formulations as defined in claim 6 wherein the soya-modified alkyd resin is present in an amount of about 85 wt %.

8. Alkyd resin formulations defined in claim 1 wherein the epoxy ester resin is an epoxy resin formed from epichlorohydrin and Bisphenol A esterified by reaction with fatty or rosin acids.

9. Alkyd resin formulations as defined in claim 8 wherein the epoxy resin is esterified with tall oil fatty acid.

10. Alkyd resin formulations as defined in claim 1 wherein the epoxy ester resin is present in amounts of from 4.75 to 7 wt %.

11. Alkyd resin formulations as defined in claim 10 wherein the epoxy resin is present in an amount of about 5 wt %.

12. Alkyd resin formulations as defined in claim 1 wherein the alkyd resin portion of said silicone modified alkyd resin and is an alkyd resin formed from phthalic anhydride and glycerol, wherein the said resin portion contains at least 15 wt % phthalic anhydride.

13. Alkyd resin formulations as defined in claim 1 wherein the silicone modified alkyd resin is present in amounts of from 4.75 to 7 wt %.

14. Alkyd resin formulations as defined in claim 13 wherein the silicone modified alkyd resin is present in an amount of about 5 wt %.

15. Alkyd resin formulations as defined in claim 1 wherein the compatible solvent is an aromatic or aliphatic hydrocarbon solvent compatible with the alkyd resin formulations.

16. Alkyd resin formulations as defined in claim 1 wherein the compatible solvent is present in amounts of from 0.5 to 2 wt %.

17. Alkyd resin formulations as defined in claim 16 wherein the compatible solvent is present in an amount of about 1 wt %.

18. Alkyd resin formulations as defined in claim 4 wherein the anti-skinning agents are present in amounts of from 0 to about 0.5 wt %; one or more driers are present in amounts of from 0 to about 3 wt %; drying activators are present in amounts of 0 to about 0.5 wt %; and silicone additives are present in amounts of from 0 to about 2 wt %.

19. Pigmented epoxy ester-modified alkyd resin enamel formulations comprising:
　(i) from about 70 to 78 wt % of the epoxy ester-modified alkyd resin formulation as defined in claim 1;
　(ii) from about 20 to 30 wt % of at least one pigment uniformly dispersed in a soya modified alkyd resin; and
　(iii) from 0 to about 2 wt % of an anti-sag additive;
said pigmented enamel formulations containing about 40 to 60% total solids.

20. Pigmented enamel formulations as defined in claim 19 wherein the pigment dispersed in a soya modified alkyd resin is a pigmented dispersion comprising about 20 to 75 wt % of at least one pigment dispersed in from about 20 to 80 wt % of a soya modified alkyd resin and from 0 to about 5 wt % of a dispersing aid.

* * * * *